United States Patent [19]

Tomioka et al.

[11] Patent Number: 4,855,951
[45] Date of Patent: Aug. 8, 1989

[54] METHOD FOR ERASING RECORDING IN A PHB MEMORY

[75] Inventors: Yasushi Tomioka, Kokubunji; Shuji Imazeki, Kodaira; Motoyasu Terao; Masahiro Ojima, both of Tokyo; Yoshio Taniguchi, Hino, all of Japan

[73] Assignee: Hitachi, Ltd., Tokyo, Japan

[21] Appl. No.: 111,611

[22] Filed: Oct. 23, 1987

[30] Foreign Application Priority Data

Oct. 24, 1986 [JP] Japan .................................. 61-251902
Dec. 1, 1986 [JP] Japan .................................. 61-284248
Jun. 11, 1987 [JP] Japan .................................. 62-144078

[51] Int. Cl.$^4$ ............................................. G11C 13/04
[52] U.S. Cl. .................................................... 365/119
[58] Field of Search ............... 365/119, 106, 114, 215, 365/125, 153, 218

[56] References Cited

U.S. PATENT DOCUMENTS 3,896,420  7/1975  Szabo ................................. 365/119
4,101,976  7/1978  Castro et al. ...................... 365/119

*Primary Examiner*—Joseph A. Popek
*Attorney, Agent, or Firm*—Antonelli, Terry & Wands

[57] ABSTRACT

A desired portion of information stored in the form of holes using hole burning phenomena is erased by irradiating a desired portion of a recording medium with light so as to erase desired holes. In this way it is possible to erase selectively only desired information among information stored in a PHB memory and further to rewrite information in the portion, where information has been erased.

17 Claims, 4 Drawing Sheets

METHOD FOR ERASING RECORDING IN A PHB MEMORY

BACKGROUND OF THE INVENTION

This invention relates to a method for erasing recording in a PHB memory and more in detail to a method for erasing (recording permitting to erase) rapidly data or information stored in a PHB memory.

Recently the method for recording and reproducing information by means of a light beam is considered to be extremely promising as future information recording means and it is desired to realize increase in recording density, possibility of rewrite, increase in and output speed, etc. as problems to be solved for use in practice. In order to solve the problems described above, research thereon such as new optical recording mediums, multiplication of the wavelength using a multilayered structure, etc. is carried out actively. Among them there is known the PHB (photochemical hole burning) memory utilizing hole burning phenomena, which will be explained later.(U.S. Pat. No. 4,101,976). The hole burning phenomena described above are scientifically interesting and known as one of high resolutional power spectroscopic methods. The PHB memory stated above utilizing these phenomena is a multiple wavelength optical memory, by means of which it is expected to increase the recording density as remarkably as about 1000 times with respect to a prior art memory. The principle therefor will be explained below.

When photochemically active molecules are embedded in a low temperature solid matrix, its absorption spectrum reflects delicate differences of the environment, in which the photochemically active molecules are embedded, and exhibits broad inhomogeneous absorption spectrum as indicated in FIG. 1A. When the molecules stated above are irradiated with a laser light beam having a narrow line width specified wavelength $\lambda_1$ within the spectrum stated above and a high intensity, only the molecules resonating with the wavelength $\lambda_1$ absorb the laser light and pass to a metastable state, which is different from the initial ground state, via an excited state. It is supposed that the metastable state mentioned above can exist due to (i) displacement of a proton within a molecule due to light absorption, (ii) change in alignment of molecules in a matrix due to light absorption, (iii) photodissociation of a molecule due to light absorption, etc. When molecules are held in the metastable state described above, it is observed that the absorption intensity is reduced only at a wavelength $\lambda_1$ in the irradiated laser light and a hole having a narrow line width is formed in the absorption spectrum, as indicated in FIG. 1B. The phenomenon, by which a hole having a narrow line width is thus formed in the absorption spectrum, when molecules are irradiated with light, is called hole burning. Further, when the molecules are irradiated with laser light while varying its wavelength successively to $\lambda_2, \lambda_3, \ldots$, a hole is formed at each of positions corresponding to the wavelengths $\lambda_2, \lambda_3, \ldots$ described above, as indicated in FIG. 1C, and in this way a multiple wavelength optical memory can be formed.

Since the fundamental principle of the PHB memory is based on delicate variations induced by light in the state of the molecules, it is necessary to pay sufficient attention to the stability of the hole in the absorption spectrum in order to hold the memory. In fact, it is known that when the temperature of the recording medium is raised to 30 to 50 K, the hole recorded by the light irradiation cannot be held stably and the hole disappears. For this reason, for the PHB memory the whole recording medium must be conserved in a cryogenic state at the liquid helium temperature of 4.2 K, at which thermal fluctuations of molecules are small, in order to prevent disappearance of the memory stated above.

As described above, research is carried out on write-in of information and holding the memory at the cryogenic temperature for the PHB memory. However the method for erasing stored information is not studied at all and no PHB memories, for which it is possible to write-in and erase information, have been yet realized. In particular, speaking from the practical point of view, it is inevitable to erase selectively a part of the stored information and nevertheless such partial erase of information has not yet been resolved.

SUMMARY OF THE INVENTION

The object of this invention is to provide a method permitting to resolve this problem of the prior art techniques and to erase selectively a desired part of information stored in a PHB memory.

In order to achieve the above object, according to the method of this invention, only the part to be erased in the recording portion of the PHB memory is selectively irradiated in order to erase information stored in the irradiated part.

Various forms of realization of the light irradiation for erasing stored information are possible. For example the selective erasure of desired information is achieved by irradiating the recording part to be erased in the PHB memory with infrared radiation.

Further it may be achieved by mixing molecules such as dye molecules having a light absorption wavelength region, which is different from that of the recording medium used for the PHB memory, therewith and irradiating the mixed recording medium thus obtained with light having a wavelength, which the molecules absorb.

It may be achieved also by irradiating the mixed recording medium with white light (wide spectrum light) having the same wavelength region as the light used for writing-in the information or by irradiating it continuously with a laser light beam by sweeping in wavelength the wavelength region for which it is desired to erase information.

DESCRIPTION OF THE PREFERRED EMBODIMENTS

Figure 1A:
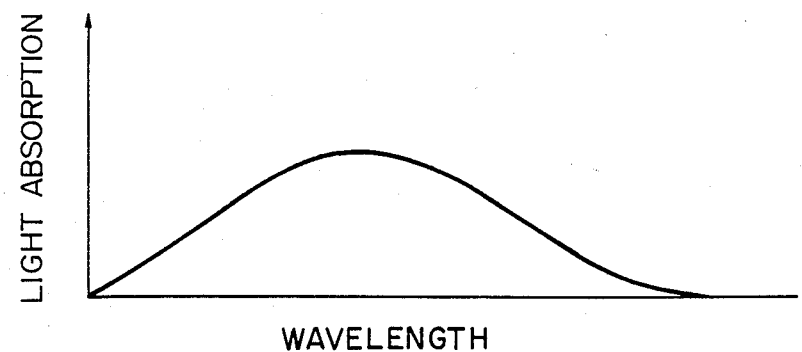
FIGS. 1A–1C are schemes for explaining the principle of the PHB memory.
Figure 1B:
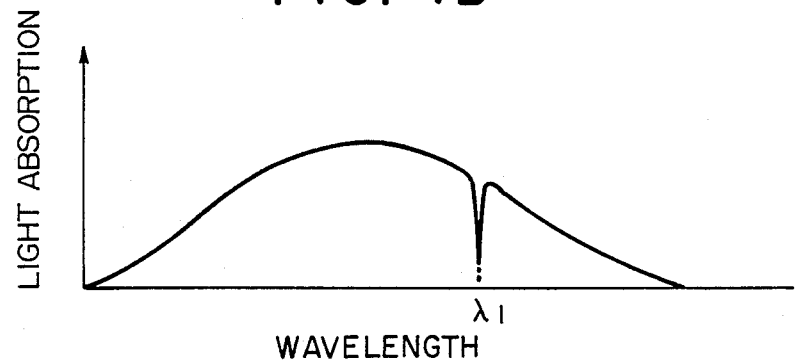
Figure 1C:
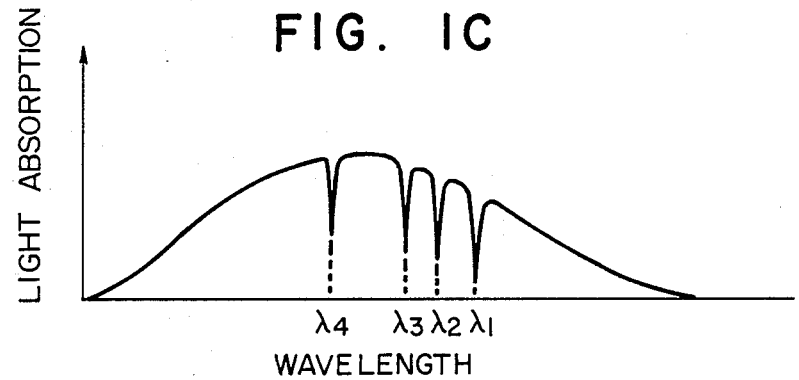

When the part, in which information to be erased is stored, is irradiated strongly with an infrared radiation, lattice vibration of the recording medium in the part irradiated with the infrared radiation is directly excited and the temperature of the irradiated part is raised. In general, the light absorption wavelength for the lattice vibration is in a region extending approximately from several $\mu$m to several hundreds of $\mu$m, corresponding principally to infrared radiation. Consequently it is desirable to irradiate molecules with infrared radiation, whose wavelength is longer than 0.7 μm, in order to excite directly lattice vibration by light. The metastable state induced by light and constituting the PHB recording is disturbed by heat causing the temperature rise described above and the holes in the absorption spectrum disappear, i.e. the PHB recording is erased. The above irradiation may be performed by using a method as disclosed for example in FIG. 1 of U.S. Pat. No. 4,101,976.

The phenomenon stated above is local one, which is produced only within a spot irradiated with the infrared radiation, and has no influence on the recording part other than and surrounding the spot. Further it is also possible to record again information by irradiating the part, where information has been erased by the method described above, with a laser light beam. Consequently it is realized to erase and rewrite information at a part of the recording medium.

Furthermore it is possible to form a mixed recording medium by mixing the recording medium with other molecules having a light absorption wavelength region, which is different from that of the recording medium and to generate holes by laser light irradiation in the broad inhomogeneous absorption spectrum due to the molecules, which take charge of the storing, in this mixed medium (hereinbelow called PHB molecules), i.e. to effect the PHB recording. In order to erase information thus recorded, the spot, where the PHB recording has been effected, is irradiated strongly with light having a wavelength so as to be absorbed by molecules, which take charge of the erasure (hereinbelow called erasing molecules). In this way the erasing molecules are excited by light and in their relaxation process the heat excited state is produced, where the lattice vibration including the host matrix is excited. For this reason the temperature of the part irradiated with light is raised by the heat thus produced. As the result, the metastable state of the PHB molecules is disturbed and the holes in the absorption spectrum disappear. That is, the temperature is raised locally by light irradiation and the PHB recording is erased.

The phenomenon stated above is local one, which is produced only within a spot irradiated with light and has no influence on the recording part other than and surrounding the local part. Further it is also possible to record again information by irradiating the part, where information has been erased by the method described above, with a laser light beam.

The desirable features of the erasing molecules are firstly that their absorption coefficient is great. For example dye molecules are suitable therefor. Secondly molecules having a strong interraction with the host matrix are desirable because a strong interraction with the matrix can increase heat conduction efficiency from the erasing molecules and make easily the metastable state of the PHB molecules disappear.

Further, as factors determining the erasing efficiency, the intensity and the duration of the light irradiation and the density of the erasing molecules in the recording medium can be enumerated. Among them the density of the erasing molecules is one of the most important factors. In order to increase the erasing efficiency, it is desirable that it is higher than the density of the PHB molecules.

Next, in the case where the erasure is effected by using wide spectrum light having the same wavelength region as that used for the write-in, the recording (hole formation) is effected by sweeping in wavelength a laser light beam having a narrow line width stepwise with a wavelength interval, which is 5 times as wide as the line width stated above in the broad inhomogeneous absorption spectrum of a material, in which the PHB recording is possible. The spot, where the PHB record has been effected, is irradiated with the wide spectrum light having the same wavelength region as that used for the recording. It may be irradiated with a laser light instead of the wide spectrum light while sweeping in wavelength continuously a wavelength region, for which it is desired to erase information. By the operation described above holes are uniformly and continuously formed over all the molecules (or recording medium) corresponding to the absorption in the wavelength region for which they are irradiated with light for the erasure. That is, delicate environment of the molecules in the recording medium is reorganized, gives a broad inhomogeneous absorption spectrum similar to the non-recorded state, and thus the PHB recording is erased.

The phenomenon stated above is local one, which is produced only within a spot irradiated with the light for erasure and has no influence on the recording part other than and surrounding the spot. This fact is identical to that described for the two preceding cases. Further it is also possible to record again information in the part, where information has been erased by this method. Consequently erasure and rewrite of the recording at a part (an arbitrary laser spot) of the recording medium are possible. Further it is possible to erase and rewrite information at a part of recording on the wavelength axis within a laser spot by selecting an arbitrary wavelength region to be swept by the laser light beam for erasure.

The erasure in this case can be more easily carried out, if the formation mechanism of the holes consists in variations in molecular alignment or delicate variations in structure of the recording medium, which are induced by light. Further this invention can be widely applied not only to organic materials based on organic molecules such as porphyrin, quinizarin, etc. but also to inorganic materials such as color center of alcalihalide crystals, which are thought to be promising from the point of view of matching with semiconductor lasers, etc.

EMBODIMENT 1

Figure 2A:
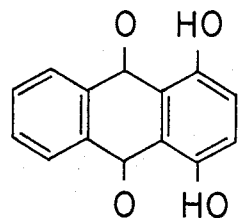
FIGS. 2A–2D, FIGS. 3A–3D, and FIGS. 4A–4D are schemes illustrating different embodiments of this invention.
Figure 2B:
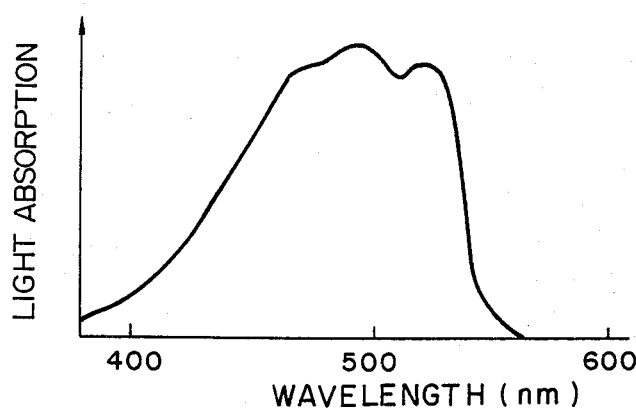
Figure 2C:
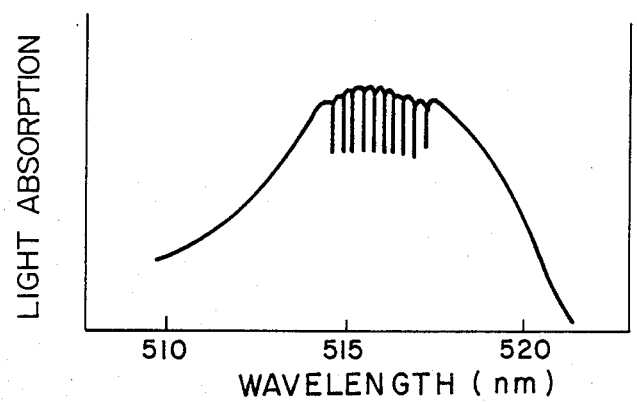
Figure 2D:
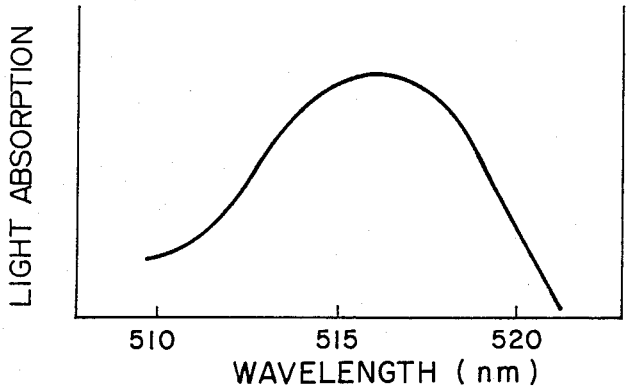

FIGS. 2A to 2D are schemes illustrating an embodiment of this invention, in which FIG. 2A indicates the chemical formula of a dye molecule used as a recording medium, FIG. 2B the absorption spectrum of the recording medium stated above, FIG. 2C the absorption spectrum of the recording medium after the recording (before the erasure), and FIG. 2D the absorption spectrum of the recording medium after an erasing operation. A recording medium was prepared by dispersing approximately uniformly 1,4-dihydroxyanthraquinone (usually called quinizarin, DAQ) having the chemical formula indicated in FIG. 2A at a concentration of about $1\times10^{-5}$M in polyvinylalcohol (PVA) and conserved at 4.2 K. The absorption spectrum of the recording medium thus prepared shows absorption due to DAQ, as indicated in FIG. 2B. At first, optical recording of binary codes in a PHB memory, as indicated in FIG. 2C, was carried out by forming holes in an absorption band of about 400-550 nm, where the DAQ has broad inhomogeneous absorption, by means of a variable wavelength dye laser.

Next a recording portion by the laser spot of 1 μm was irradiated with light emitted by an Nd:YAG laser (oscillation wavelength 1.06 μm) of 10 mW for 15 seconds for erasing the recording. As the result the holes in the PHB memory formed in the absorption band of DAQ disappeared perfectly, as indicated in FIG. 2D, and thus the erasure of the PHB memory was achieved. In addition, it was also possible to erase satisfactorily recording by using a semiconductor laser, a $CO_2$ laser, etc. having an oscillation wavelength region in the infrared region having wavelengths longer than 0.7 μm as the laser device for erasure. Furthermore, in this case, recording in the adjacent spots were conserved as they were.

EMBODIMENT 2

Figure 3A:
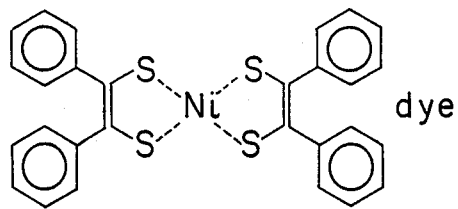
Figure 3B:
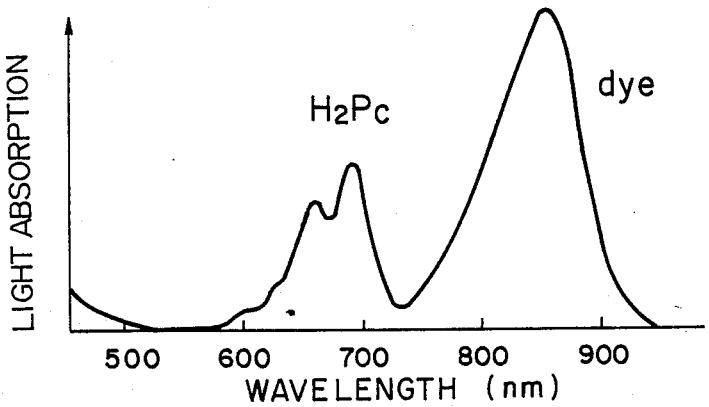
Figure 3C:
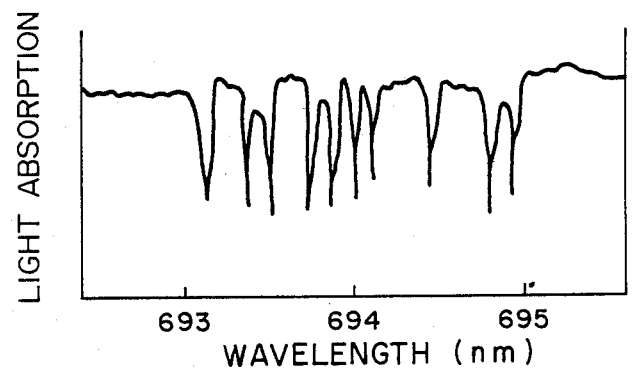
Figure 3D:
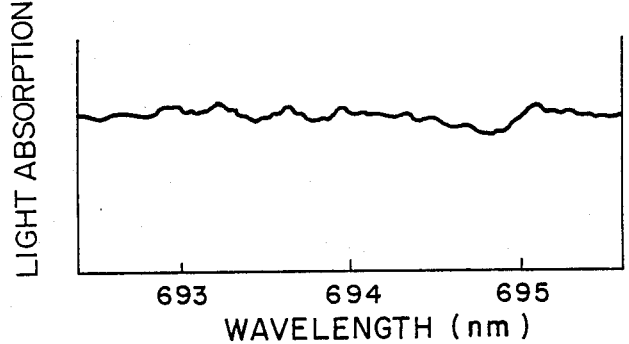

FIGS. 3A to 3D are schemes illustrating another embodiment of this invention, in which FIG. 3A indicates the chemical formula of a dye molecule mixed for the erasure, FIG. 3B the absorption spectrum of the recording medium, FIG. 3C the absorption spectrum of the PHB memory before an erasing operation, and FIG. 3D the absorption spectrum after the erasing operation. A recording medium was prepared by dispersing metal free phtalocyanine (hereinbelow abbreviated to $H_2Pc$) and dye molecules (hereinbelow called simply dye) having the chemical formula indicated in FIG. 3A at concentrations of $1 \times 10^{-5}M$ and $1 \times 10^{-4}M$, respectively, in polymethylmetacrylate and conserved at 4.2 K. The absorption spectrum of the recording medium prepared by the mixing described above is indicated in FIG. 3B. At first optical recording in a PHB memory based on the displacement of protons was carried out in an absorption band of about 600–700 nm, where $H_2Pc$ has broad inhomogeneous absorption, by means of a variable wavelength dye laser. The record stated above consists of binary codes constituted by holes, as indicated in FIG. 3C.

Next the recording portion within a laser spot of 1 μm was irradiated with light emitted by a GaAlAs semiconductor laser, which matches well to the absorption (about 800–900 nm) of the dye, which takes charge of the erasure. The duration of the irradiation and the intensity were ten times as great as those for the recording, respectively. As the result, the holes in the PHB memory formed in the absorption band of $H_2Pc$ disappeared perfectly, as indicated in FIG. 3D. Further it was verified that holes in the PHB memory can be newly formed (rewritten) in the portion, where information has been erased. Furthermore, in the erasure described above, recording in the adjacent spots were conserved without being erased.

EMBODIMENT 3

Figure 4A:
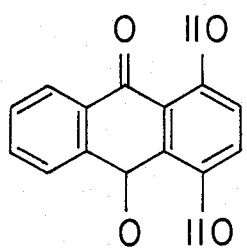
Figure 4B:
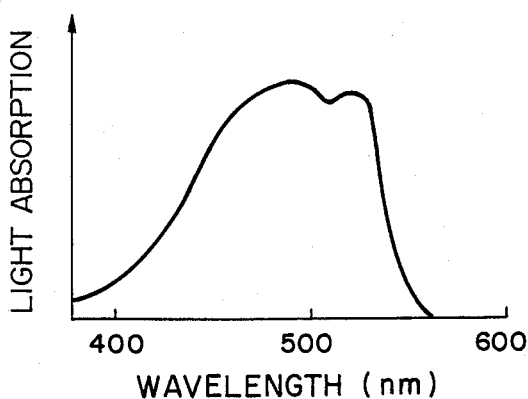
Figure 4C:
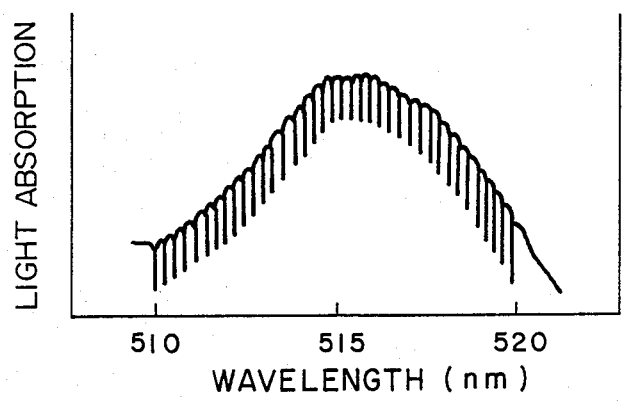
Figure 4D:
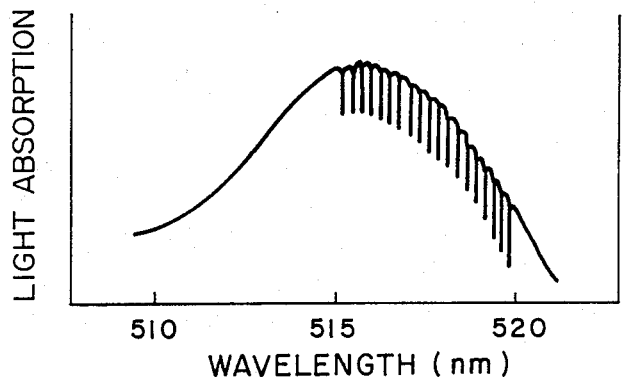

FIGS. 4A to 4D are schemes illustrating still another embodiment of this invention, in which FIG. 4A indicates the chemical formula of a dye molecule used as the recording medium, FIG. 4B the absorption spectrum of the recording medium stated above, FIG. 4C the absorption spectrum of the PHB memory after the recording (before the erasure), and FIG. 4D the absorption spectrum of the PHB memory after an erasing operation. A recording medium was prepared by dispersing approximately uniformly 1.4-dihydroxyanthraquinone (usually called quinizarin, DAQ) having the structure represented by the chemical formula indicated in FIG. 4A at a concentration of about $1 \times 10^{-5}M$ in polyvinylalcohol (PVA) and conserved at a temperature of 4.2 K. The absorption spectrum of the recording medium thus prepared shows absorption due to DAQ, as indicated in FIG. 4B. At first, optical recording of binary codes in a PHB memory, as indicated in FIG. 4C, was carried out by forming holes in an absorption band of 400–550 nm, where the DAQ has broad inhomogeneous absorption, by means of a variable wavelength dye laser.

Next a recording portion by the laser spot of 1 μm was irradiated with light emitted by the same variable wavelength dye laser as that used for the recording while sweeping in wavelength continuously a wavelength region of 510–515 nm. As the result, among the holes in the PHB memory formed in the absorption band of DAQ those formed by irradiation in the wavelength region of 510–515 nm disappeared nearly perfectly, as indicated in FIG. 4D, and thus the erasure of the PHB memory was achieved. In addition, it was also possible to rewrite information in the region, where information had been erased, just as in the preceding embodiments 1 and 2.

As explained above, according to this invention, it is possible to erase and rewrite selectively only desired information among stored information by raising selectively the temperature only at a desired portion of the PHB memory without raising the temperature of the whole recording medium, by irradiating the stored information with light by the hole burning of the recording medium.

What is claimed is:

1. A method for erasing recording in a PHB memory, wherein a desired portion of a recording medium, in which a plurality of holes are formed by hole burning, is irradiated with light so that among said plurality of holes only the holes, which are irradiated with said light, are selectively erased for the purpose of erasing a desired portion of information stored in the form of said plurality of holes in said recording medium.

2. A method for erasing recording in a PHB memory according to claim 1, wherein said light is infrared radiation.

3. A method for erasing recording in a PHB memory according to claim 2, wherein the wavelength of said infrared radiation is longer than 0.7 μm.

4. A method for erasing recording in a PHB memory according to claim 1, wherein said recording medium is prepared by dispersing 1,4-dihydroxyanthraquinone in polyvinylalcohol.

5. A method for erasing recording in a PHB memory according to claim 1, wherein said recording medium comprises a first material, in which hole burning can be effected by irradiating it with a first light beam, and a second material having a light absorption wavelength region, which is different from that of said first material, and erasure is effected by irradiating said recording medium with a second light beam, which can be absorbed by said second material.

6. A method for erasing recording in a PHB memory according to claim 5, wherein said first material is phthalocyanine.

7. A method for erasing recording in a PHB memory according to claim 5, wherein said second material is a dye.

8. A method for erasing recording in a PHB memory according to claim 5, wherein said first light beam is produced by a variable wavelength dye laser.

9. A method for erasing recording in a PHB memory according to claim 5, wherein said second light beam is produced by a GaAlAs laser.

10. A method for erasing recording in a PHB memory according to claim 1, wherein erasure is effected by irradiating said recording medium with a second light having a continuous wavelength region including a wavelength of a first light used for said hole burning.

11. A method for erasing recording in a PHB memory according to claim 10, wherein said second light is white light.

12. A method for erasing recording in a PHB memory according to claim 10, wherein said second light is a laser light and said erasure is effected by irradiating continuously said recording medium with said second light while sweeping in wavelength the wavelength region for which information is to be erased.

13. A method for erasing recording in a PHB memory according to claim 12, wherein said first and second light beams are produced by variable wavelength dye lasers and said erasure is effected by irradiating said recording medium while sweeping in wavelength continuously the wavelength region of said second light beam comprised between 510 and 515 nm.

14. A method for erasing recording in a PHB memory according to claim 10, wherein said recording medium includes 1,4-dihydroxyanthraquinone.

15. A method for erasing recording in a PHB memory according to claim 10, wherein said holes are formed in a wavelength region comprised between 400 and 550 $\mu$m.

16. A method for erasing recording in a PHB memory according to claim 10, wherein said first light beam is produced by a variable wavelength dye laser.

17. A method for erasing recording in a PHB memory according to claim 1, wherein said PHB memory has a metastable state in which information is stored in the form of said plurality of holes in said recording medium, said metastable state being retained until said PHB memory is irradiated for erasure.

* * * * *